April 6, 1965   J. C. GUNN   3,176,836
PICTURE KIT
Filed June 24, 1963

INVENTOR.
JOE C. GUNN
BY John R. Walker, III
Attorney

United States Patent Office 3,176,836
Patented Apr. 6, 1965

3,176,836
PICTURE KIT
Joe C. Gunn, Box 523, Washington, Mo.
Filed June 24, 1963, Ser. No. 289,936
4 Claims. (Cl. 206—45.33)

This invention relates to artistic handcrafts or handiwork generally. More specifically, the present invention includes a kit comprising the necessary materials for making a picture.

The present invention is amusing or entertaining for adults and the finished picture therefrom is attractive and pleasing to the eye. However, the present invention is directed primarily toward children, and particularly young children of kindergarten or early elementary school age. Young school-age children like toys or materials that they "do with"; that is, they like such things that they can experiment with and can put together to create something new or different.

It is thus the primary object of the present invention to provide a picture kit wherewith a child can have the opportunity to learn by doing and to encourage wholesome and creative play activity.

A further object is to provide a picture kit with which the child can learn to manipulate and experiment with various materials.

A further object is to provide a picture kit that teaches a child color and form of the various animate and inanimate objects which he sees in the world around him.

A further object is to provide a picture kit to encourage a child in activity which has a particular goal in mind.

A further object is to provide a picture kit wherewith the picture is formed of vegetable seeds of various colors and shapes, and such a kit having means for designating certain seeds for certain areas of the picture, thus to serve as a guide in assembling the kit.

A further object is to provide a picture kit to form a picture which is realistic and attractive in the natural colors of the various vegetable seeds.

A further object is generally to improve the design and construction of picture kits.

The means by which the foregoing and other objects of the present invention are accomplished and the manner of their accomplishment will be readily understood from the following specification upon reference to the accompanying drawings, in which.

Figure 1:
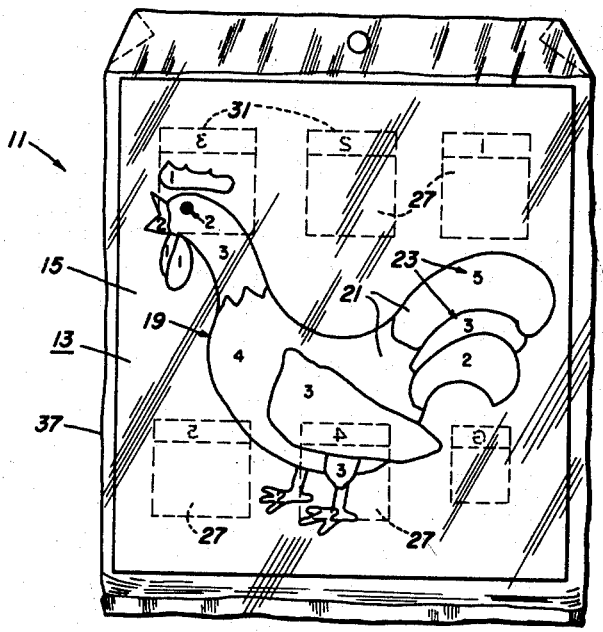
FIG. 1 is a front side view of the kit of the present invention.

Referring now to the drawings in which the various parts are indicated by numerals, the picture making kit 11 of the present invention comprises a base member 13 of sheet material, preferably rectangularly formed having a front side 15 and a back side 17. Base member 13 may be of cardboard, fiberboard, or any suitable porous paper product. However, the preferred base member 13 is of cardboard.

A pattern 19 is provided on the surface of front side 15. Pattern 19, as shown in FIG. 1 and in the preferred form, is of lined construction and defines the outline and demarcates certain areas 21 of a represented animate or inanimate object. Pattern 19 or the object represented thereby may be of many things; however, particularly if the kit is for young children, the design of pattern 19 should be of a familiar and colorful animal or the like. Pattern 19 is preferably stamped or otherwise imprinted mechanically on base member 13, although this may be done by hand. It should be noted that each demarcated area 21 is completely enclosed, the reason for this being apparent further in the specification. Within each of enclosed areas 21, suitable identifying indicia is provided. This indicia is preferably in the form of numbers 23 which should be conspicuously placed substantially in the center of that area to be identified.

Figure 2:
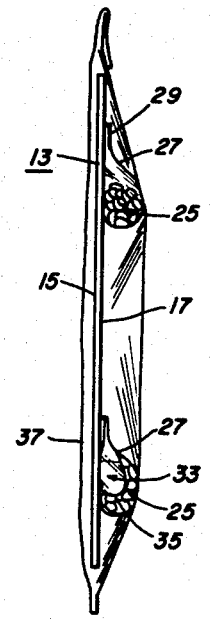
FIG. 2 is an edge view, as viewed from the right of FIG. 1.
Figure 3:
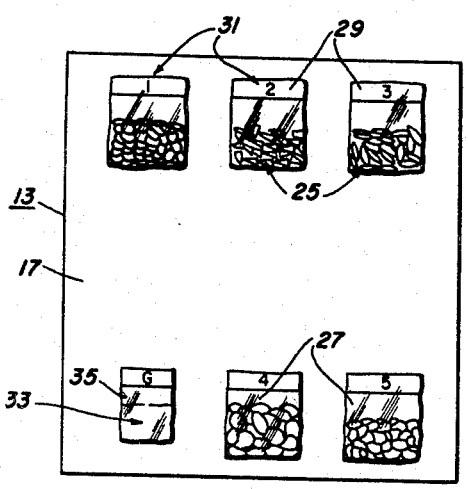
FIG. 3 is a back side view.
Figure 4:
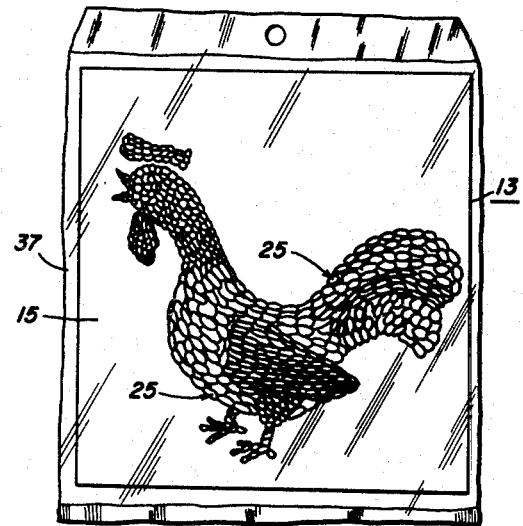
FIG. 4 is a view of the kit of the present invention as assembled and in the completed form.

Vegetable seeds 25, as best seen in FIG. 3, are provided and serve as the principal media in the forming of the picture. Seeds 25 are preferably from those plants having colorful seeds of uniform shape and texture, and they should be of sufficient size to be handled easily. Several varieties of beans and corn, preferably of five different kinds and colors, are the preferred seeds for use in the picture making kit. Beans and corn both have colorful seeds and exhibit strong colors of red, green, black, yellow, and other colors, and are very well suited for use in the picture kit. Vegetable seeds 25 are grouped according to like kinds and are placed in separate containers 27. Containers 27 are preferably of cellophane or other such flexible transparent material and, as best seen in FIGS. 2 and 3, are bag-like and provided with a suitable closure portion 29. Each of containers 27 has attached thereto, or otherwise provided thereon, suitable identifying indicia corresponding to the indicia on base member 13, and each of the containers has substantially the amount of seeds to fill the area 21 on base member 13 that has its corresponding number. For example, the container designated "1" has the right amount of seeds to fill the areas designated "1." The identifying indicia on each of containers 27 is preferably in the form of numbers 31, as best seen in FIG. 3. Each container 27 is removably attached to the back side 17 of base member 13. The containers may be attached by an adhesive or by stapling. The preferred way, however, is by adhesive with the adhesive being between base member 13 and containers 27 and along closure portion 29. The placement of vegetable seed containers 27 on member 13 is best seen in FIG. 3, wherein it will be seen the containers are disposed along upper and lower opposite edge portions on back 17 of base member 13.

Adhesive means is provided and is also preferably attached to the back side of member 13. The adhesive means in the preferred form includes a suitable glue 33 which is preferably liquid in form and is held in a container 35 that is similar to vegetable seed containers 27. The container of glue 33 is attached to base member 13 in a similar manner as are the containers of vegetable seeds. An envelope 37 is provided for enclosing the kit as it is marketed, and also serves as a holder to exhibit the finished picture.

To put the kit together or to form a picture, the person takes the base member along with the seeds from the envelope package and then removes the individual packages of seed containers and glue from the base member. The base member is then placed flat on a table or the like, with the patterned side facing upwards, and the separate containers of vegetable seeds are opened. A quantity of glue is placed within a desired area of the pattern, and the number of this area noted. The vegetable seeds in that container with the number corresponding to the number of the area is then placed upon the pattern until the complete area has been filled. The remainder of the numbered areas are filled with seeds from containers having numbers corresponding to the number of each particular area. The respective areas are thus filled with a designated seed until the balance of the areas are filled and the picture completed. After the glue has dried and the seeds are securely attached to the base member, the picture may be protectively enclosed in envelope 37 and exhibited.

From the foregoing it is readily seen that the picture kit of the present invention affords a pleasurable form of entertainment for adults and children. When used by adults, it provides means for a very enjoyable diversion or hobby, and the constructed pictures from such kits are attractive and suitable for display or for gifts. For young children, the present invention, in addition to being entertaining, aids in teaching them form and color of the objects around them and their environment. Moreover, it serves to teach or develop desired attributes by controlled or directed effort and generally to encourage the child in wholesome and constructive play activity. Moreover, by having the seeds separated in containers which have numbers thereon that correspond to the numbered areas where the seeds are to be placed, the best grouping of seeds to make the most attractive picture can be predetermined by the manufacturer of the kit. Then, this attractive picture can be easily duplicated by a person by simply adhering the seeds from the numbered containers respectively on the correspondingly numbered areas. Also, there is no waste of seeds, since the right amount is provided in each container.

Although the invention has been described and illustrated with respect to a preferred embodiment thereof, it is to be understood that it is not to be so limited, since changes and modifications may be made therein which are within the full intended scope of this invention as hereinafter claimed.

I claim:

1. A kit containing the necessary material for constructing a picture comprising a base member of flat cardboard material having a front surface and a back surface, a pattern printed on said front surface having lines defining the outline and demarcating certain areas for the picture to be constructed, a plurality of different kinds of vegetable seeds, a like plurality of container bag means of flexible transparent material attached to said back surface for attaching said seeds to said base member with each container bag containing like seeds of a kind of said plurality of different kinds of vegetable seeds, identifying indicia on each of said plurality of container bag means, and corresponding indicia on said base member disposed within said certain areas of said pattern.

2. A kit containing the necessary material for constructing a picture comprising a base member of flat cardboard material having a front surface and a back surface, a pattern printed on said front surface having lines defining the outline and demarcating certain areas for the picture to be constructed, a plurality of different kinds of vegetable seeds, a like plurality of container bag means removably attached to said back surface with each bag container containing like seeds of a kind of said plurality of different kinds of vegetable seeds, identifying indicia on each of said plurality of container bag means, corresponding indicia on said base member disposed within said certain areas of said pattern, and glue means contained in a receptacle removably attached to said back surface for attaching said seeds to said base member with said seeds of each bag container being adapted for attachment to a said area of said pattern having an indicia corresponding thereto.

3. A kit containing the necessary material for constructing a picture comprising a base member of flat cardboard material having a front surface and a back surface, a pattern printed on said front surface having lines defining the outline and demarcating certain areas for the picture to be constructed, a plurality of different kinds of vegetable seeds, a like plurality of container bag means removably attached to said back surface with each bag containing like seeds of a kind of said plurality of different kinds of vegetable seeds, identifying indicia on each of said plurality of container bag means, corresponding indicia on said base member disposed within said certain areas of said pattern, adhesive means removably attached to said back surface for attaching said seeds to said base member with said seeds of each of said container bag means being adapted to be attached to a said area of said pattern having an indicia corresponding thereto; and an envelope of flexible transparent material collectively holding said base member, said plurality of container bag means, and said adhesive means.

4. The kit of claim 3 in which the number of seeds in each of said containers is in substantially the right amount to substantially fill said area of said pattern having an indicia corresponding thereto.

References Cited by the Examiner
UNITED STATES PATENTS

| | | | |
|---|---|---|---|
| 1,224,363 | 5/17 | Crump | 35—26 |
| 2,239,970 | 4/41 | Osborne | 35—26 |
| 2,807,362 | 9/57 | Haddad | 206—78 |
| 2,937,931 | 5/60 | Nugent | 35—26 |
| 2,964,858 | 12/60 | Rutherford | 35—26 |

FOREIGN PATENTS 342,912  2/31  Great Britain.

THERON E. CONDON, *Primary Examiner.*